(12) United States Patent
Linke et al.

(10) Patent No.: US 8,992,208 B2
(45) Date of Patent: Mar. 31, 2015

(54) DEVICE FOR TRANSPORTING PREFORMS FOR BLOW MOLDING CONTAINERS

(75) Inventors: Michael Linke, Hamburg (DE); Rolf Baumgarte, Ahrensburg (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 14/236,866

(22) PCT Filed: Sep. 10, 2012

(86) PCT No.: PCT/EP2012/003789
§ 371 (c)(1),
(2), (4) Date: Feb. 3, 2014

(87) PCT Pub. No.: WO2013/034309
PCT Pub. Date: Mar. 14, 2013

(65) Prior Publication Data
US 2014/0161924 A1    Jun. 12, 2014

(30) Foreign Application Priority Data
Sep. 9, 2011   (DE) .......................... 10 2011 113 310

(51) Int. Cl.
*B29C 49/42* (2006.01)
*B29C 49/28* (2006.01)
(Continued)

(52) U.S. Cl.
CPC ......... *B29C 49/4205* (2013.01); *B29K 2023/12* (2013.01); *B29K 2067/003* (2013.01); *B29C 49/06* (2013.01); *B29C 49/12* (2013.01); *B29C 49/16* (2013.01); *B29C 49/36* (2013.01);
(Continued)

(58) Field of Classification Search
USPC ...................... 425/534; 198/803.12; 279/2.23
See application file for complete search history.

(56) References Cited

U.S. PATENT DOCUMENTS

| 6,273,705 | B1 | 8/2001 | Schoch |
| 2008/0017779 | A1* | 1/2008 | Lapert ........................... 248/560 |
| 2011/0177193 | A1 | 7/2011 | Linke et al. |

FOREIGN PATENT DOCUMENTS

| DE | 2352926 A1 | 4/1975 |
| DE | 4212593 A1 | 10/1993 |

(Continued)

OTHER PUBLICATIONS

English Translation of International Preliminary Report on Patentability dated Mar. 20, 2014 in corresponding International Patent Application No. PCT/EP2012/003789, filed Sep. 10, 2012.

*Primary Examiner* — Robert B Davis
(74) *Attorney, Agent, or Firm* — Rankin, Hill & Clark LLP

(57) ABSTRACT

A device for forming containers from heated parisons of thermoplastic material, which includes a heating section and a blow molding unit provided with at least one blow molding station. The parisons are held along at least a portion of a transport path between the heating section and the blow molding unit by a carrying element, which has a head that can be inserted into a mouth section of a parison and which includes at least two positionable clamping elements. At least one of the clamping elements is positioned in a recess provided on a side of the head relative to a longitudinal axis of the carrying element. The recess has upper and lower sliding surfaces that extend obliquely relative to the longitudinal axis for acting on the clamping element. The upper head part and the lower head part are braced relative to each other by at least one spring.

12 Claims, 9 Drawing Sheets

(51) Int. Cl.
  *B29K 23/00* (2006.01)
  *B29K 67/00* (2006.01)
  *B29C 49/06* (2006.01)
  *B29C 49/12* (2006.01)
  *B29C 49/16* (2006.01)
  *B29C 49/36* (2006.01)
  *B29C 49/64* (2006.01)

(52) U.S. Cl.
  CPC ............. *B29C49/6418* (2013.01); *B29C 49/28* (2013.01); *B29C 49/6409* (2013.01)

USPC ...................... 425/534; 198/803.13; 279/2.23

(56) References Cited

FOREIGN PATENT DOCUMENTS

| | | |
|---|---|---|
| DE | 4340291 A1 | 6/1995 |
| DE | 19906438 A1 | 8/2000 |
| DE | 102005011805 A1 | 1/2007 |
| DE | 102008023701 A1 | 11/2009 |
| EP | 1880825 A1 | 1/2008 |

\* cited by examiner

DEVICE FOR TRANSPORTING PREFORMS FOR BLOW MOLDING CONTAINERS

The invention relates to a device for blow molding containers which comprises a heating section for heating parisons made of a thermoplastic material and is provided with a blow molding unit comprising at least one blow molding station for shaping the parisons into the containers, and in which a carrying element for transporting the parisons comprises at least two positionable clamping elements in the region of a head that can be inserted into a mouth section of the parison, and in which the clamping elements are designed to be rounded at least in some regions, and wherein the clamping elements are disposed at a distance relative to each other along an outer circumference of the head, and in which at least one of the clamping elements is positioned in a recess that is provided on the side of the head relative to a longitudinal axis of the carrying element, wherein the recess has upper and lower sliding surfaces that extend obliquely relative to the longitudinal axis for acting upon the clamping element, and wherein the head comprises a lower head part that is provided with the lower sliding surface and an upper head part that is provided with the upper sliding surface.

In this kind of container molding by the action of blowing pressure, parisons made of a thermoplastic material, for example parisons made of PET (polyethylene terephthalate), are fed to various processing stations within a blow molding machine. Such a blow molding machine typically comprises a heating unit and a blowing unit, in which the parison, which has first been brought to the desired temperature, is expanded by biaxial orientation to obtain a container. The expansion is carried out using pressurized air, which is introduced into the parison to be expanded. The process of such an expansion of the parison is described in the patent application DE 43 40 291. The introduction of the pressurized gas mentioned at the outset also includes the introduction of pressurized gas into the resulting container bubble and the introduction of pressurized gas into the parison at the beginning of the blow molding operation.

The basic design of a blow molding station for molding containers is described in the patent application DE 42 12 593. Options for bringing the parisons to the desired temperature are described in the patent application DE 23 52 926.

Within the blow molding device, the parisons and the blown containers can be transported using a variety of handling devices. The use of transport mandrels, onto which the parisons are slipped, is known. However, the parisons can also be handled using other carrying devices. Other available designs include the use of gripping tongs for handling parisons and the use of clamping mandrels, which can be inserted into a mouth region of the parison for mounting.

The handling of containers and parisons using transfer wheels is described, for example, in the patent application DE 199 06 438, with a transfer wheel being disposed wheel between a blow molding wheel and a discharge section, and a further transfer wheel being disposed between the heating section and the blow molding wheel.

The above-described handling of the parisons takes place, on the one hand, in so-called two-stage processes, in which the parisons are first produced in an injection molding process and temporarily stored and are conditioned at a later time in terms the temperature thereof and inflated into a container. On the other hand, use in so-called single-stage processes is possible, in which the parisons have been brought to a suitable temperature directly after they have been produced by way of injection molding and sufficiently solidified and the parisons are then inflated.

Various embodiments are known with respect to the blow molding stations that are used. In blow molding stations that are disposed on rotating transport wheels, the mold carriers can frequently be folded open in a book-like manner. However, it is also possible to employ mold carriers that can be displaced relative to each other or are guided in a different manner. Typically, platens disposed parallel to each other are used as mold carriers in stationary blow molding stations, which are in particular suited to accommodate multiple cavities for container molding.

The transport mandrels used for transporting the parisons cannot yet meet all the requirements that are placed on them in terms of reliable transport of the parisons at a high transport speed. In particular, transport mandrels that are inserted into a mouth region of the parisons still have a number of deficiencies. The known clamping mandrels are generally composed of a hard core having an O-ring made of elastomer placed on the outside. When the clamping mandrel is inserted into the mouth region of the parison, the O-ring is elastically deformed, resulting in fixation of the parison on the clamping mandrel.

Such mounting of the parisons has been found to be unreliable as the operating time increases. For one, the inside diameters of the parisons are subject to manufacturing tolerances, which result in variable clamping forces. Moreover, the elasticity, and thus the generated elastic spring force of the elastomer material, changes with increased aging and as a function of the respective prevailing temperature. It is also not possible to apply excessive stress to the mouth region as a precautionary measure, since such high stress would result in deformation of the mouth region. Given these properties of the elastomer materials, it is to be expected that a substantial number of parisons will fall off the clamping mandrels and be unavailable for the subsequent blow molding operation.

DE 10 2005 011 805 already describes a controllable clamping element, which is made of an elastomer material and designed as a spring-like hollow profiled section. While considerable improvements have already been achieved over the use of solid profiled sections, for example in the form of O-rings, the requirements in regard to a uniform and reproducible generation of clamping forces over a long operating time have nonetheless not been satisfactorily met as of yet.

DE 10 2008 023 701 describes a controllable clamping element, which is made of a ceramic material. While this design has been found to be extremely functional, the associated manufacturing costs are relatively high due to the active controllability that is implemented.

Both actively controllable and passive clamping elements are thus already known from the prior art. However, the prior art does not yet provide a carrying element that is provided with clamping elements and that has both high functionality and is also inexpensive to produce.

It is the object of the present invention to design a device of the type described at the outset in such a way that reliable transport of the parisons at a high transport speed is supported, and additionally inexpensive manufacturing of the transport element is achieved.

This object is achieved according to the invention by bracing the upper head part and the lower head part relative to each other using at least one spring, which acts on the upper head part in a region facing away from the lower head part.

Due to the spring, preferably a compression spring, acting on the upper face of the upper head part which faces away from the lower head part, the clamping elements protruding from the recesses of the head are acted on, when the mouth region of a parison is pushed onto the head, in such a way that these elements are displaced in the direction of the upper head part. The clamping elements transmit the forces acting in the direction of the longitudinal axis of the carrying element onto the upper head part and displace the same against the acting spring force. This causes a relative movement between the upper head part and the lower head part in such a way that the sizes of the recesses are increased. As a result, the clamping elements can migrate further into the recesses and allow the mouth section of the parison to be completely pushed onto the head of the carrying element.

It is thus essential for the function of the head of the carrying element which is provided with a passive clamping function that the forces that are transmitted to the head when the mouth section of the parison is pushed onto the head result in an increase in the size of the recesses, and thus in a reduction of the clamping forces that act between the clamping elements and the mouth section of the parison. This is favorable in terms of pushing the parison onto the head in a manner that requires comparatively little force and is gentle on the parison. After this pushing process has been completed, the head of the carrying element is disposed within the mouth section of the parison and the clamping elements thereof act on the inside of the mouth section. As an alternative, it is also possible to mount blown containers using the head of the carrying element according to the invention, instead of mounting parisons.

Arranging the spring so that the spring acts on the upper head part in a region facing away from the lower head part in particular makes it possible to position the spring in a region outside the mouth section of the parison. The spring is thus disposed in a region that is sufficiently large to accommodate the spring, whereby the use of the spring does not result in any unnecessary complicated geometry of the head. Moreover, the spring is disposed in a region that is typically not exposed to heat radiation when the parisons are heated.

Compared to one or more spring elements acting directly on the clamping elements, the design according to the invention thus has considerable advantages, both with respect to achieving a compact as well as clearly structured design and with respect to providing lasting high function.

According to a conventional use, the lower head part is completely inserted into the mouth section of the parison, and the upper head part protrudes from the mouth section of the parison in the region of the extent that faces away from the lower head part.

Predeterminable positioning of the lower head part is supported by connecting the lower head part to a shaft.

A relative movement between the lower head part and the upper head part is enabled by the shaft extending through the upper head part.

Trouble-free operation is supported by designing the spring as a compression spring.

So as to achieve a compact design, it is proposed that the shaft extends through the spring.

The spring-loaded bracing of the upper head part relative to the lower head part can be implemented by the spring being supported on a projection of the shaft.

According to one design variant, the projection may be formed by a step.

An inexpensive design is supported by producing the shaft from a rod and a tube that surrounds the rod at least regionally.

An advantageous transmission of clamping forces is achieved by designing the clamping element cylindrically at least in some regions and being tapered in the region of the end regions thereof that point in the direction of the longitudinal element axis.

It has been found to be advantageous for the positioning of the clamping elements if the tapers are designed as truncated cones.

A planar transmission of forces can be achieved in that, relative to the longitudinal element axis, the tapers have angles of inclination that correspond to the angles of inclination of the sliding surfaces.

The rounded configuration of the clamping elements and the use of multiple separate clamping elements allow defined radial positioning of the clamping elements, without making elastic deformation necessary. The clamping elements can be positioned exactly in a radial direction for carrying out the clamping operation. The rounded contour supports easy gliding on associated guide surfaces. Moreover, the clamping forces can be introduced in a locally limited manner into the region of an inner boundary of the mouth section of the parison.

A transport of the parisons without carrying out turning operations is supported in that the parisons at least along a portion of the transport path thereof are transported by the carrying element having the mouth sections oriented perpendicularly upward.

Exemplary embodiments of the invention are shown schematically in the drawings. In the drawings.

Figure 1:
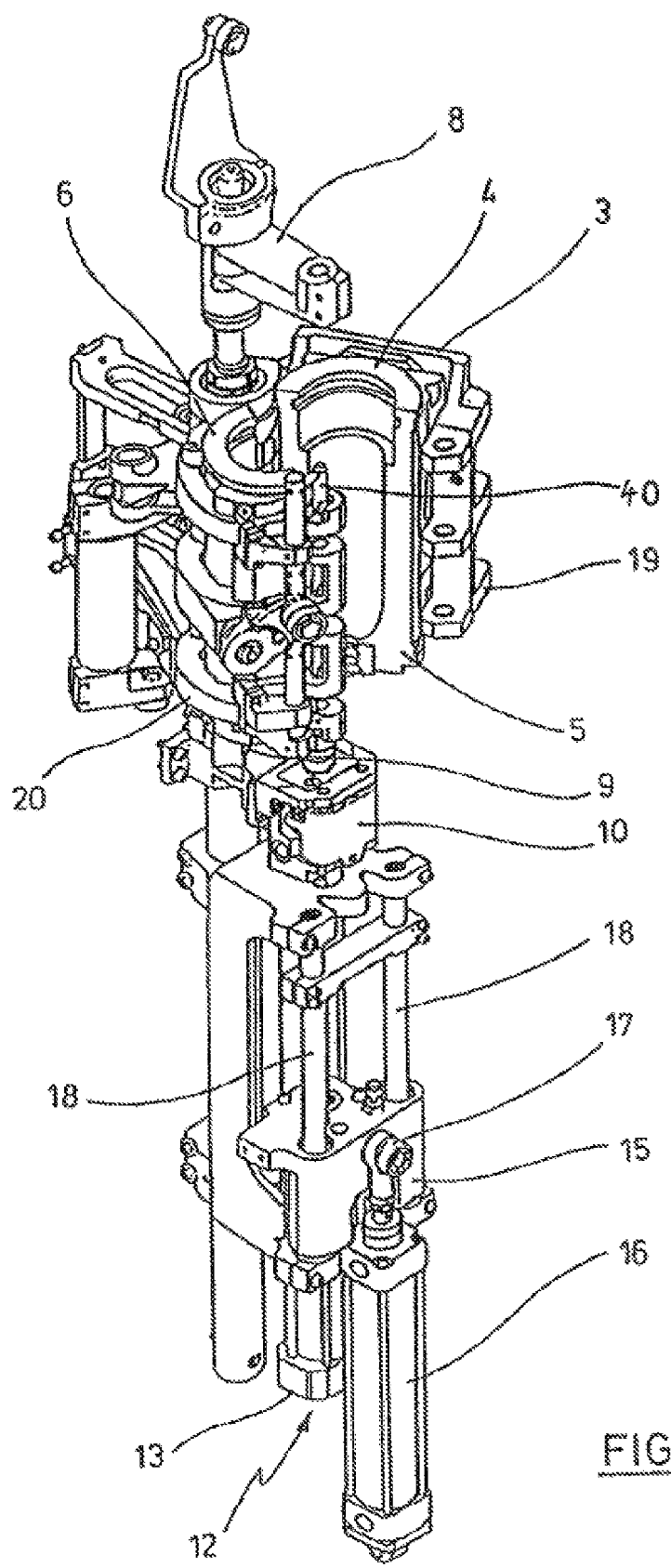
FIG. 1 shows a perspective illustration of a blow molding station for producing containers from parisons.
Figure 2:
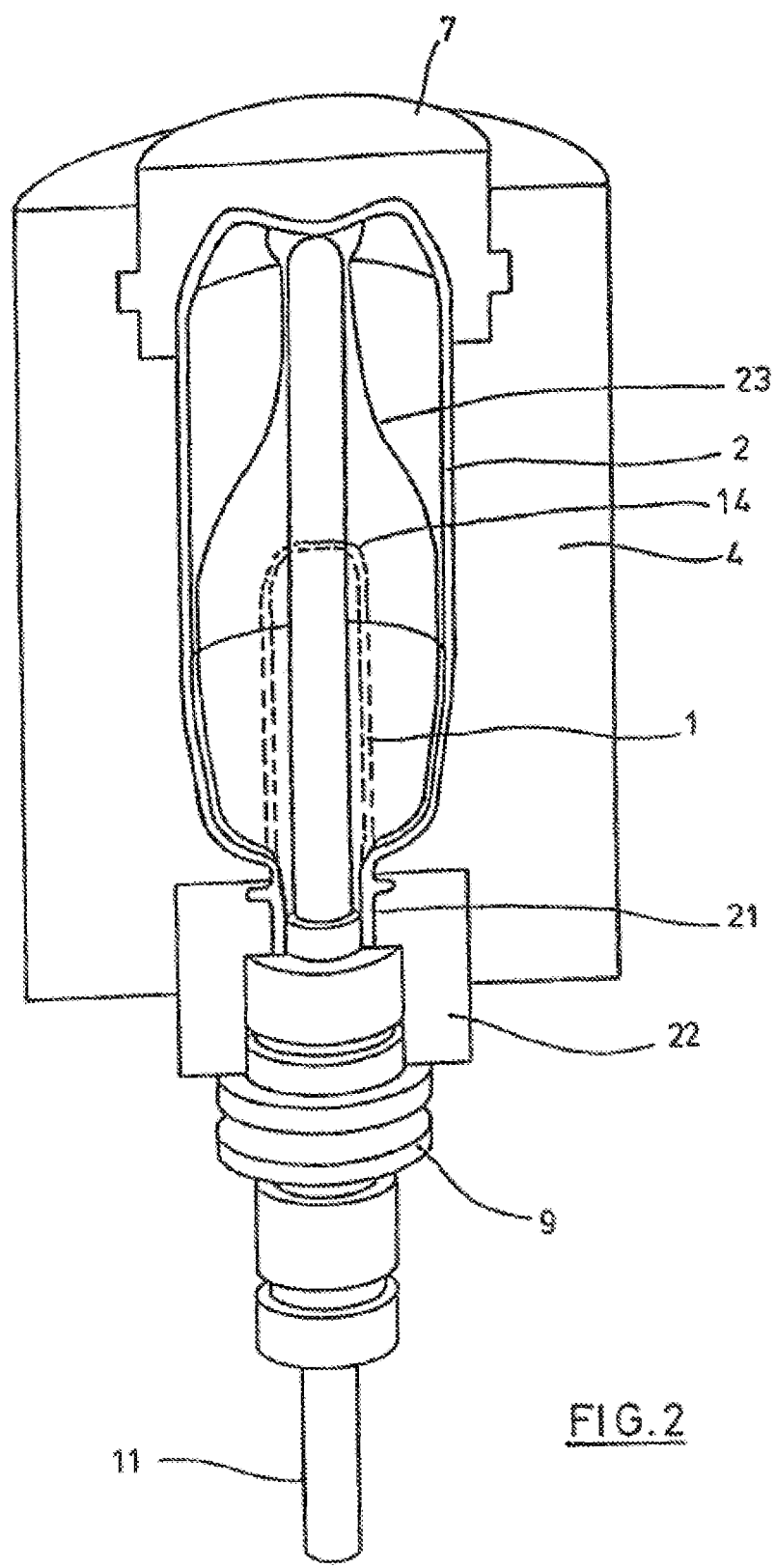
FIG. 2 shows a longitudinal sectional view through a blowing mold in which a parison is stretched and expanded.

The basic design of a device for shaping parisons (1) into containers (2) is shown in FIG. 1 and in FIG. 2. The arrangement may be provided as illustrated or rotated 180° in a vertical plane.

The device for molding the container (2) is essentially composed of a blow molding station (3), which is provided with a blow mold (4) into which a parison (1) can be inserted. The parison (1) may be an injection-molded part made of polyethylene terephthalate. So as to allow the parison (1) to be inserted into the blow mold (4) and allow the finished container (2) to be removed, the blow mold (4) is composed of mold halves (5, 6) and a bottom part (7), which can be positioned by a lifting device (8). The parison (1) can be fixed by a holding element (9) in the region of the blow molding station (3). For example, it is possible to insert the parison (1) directly into the blow mold (4) using tongs or other handling means.

So as to allow pressurized air to be supplied, a connecting piston (10) is disposed beneath the blow mold (4), supplying pressurized air to the parison (1) while also providing a sealing function. However, in a modified design, it is also conceivable in principle to use fixed pressurized air supply lines.

In this exemplary embodiment, the parison (1) is stretched by way of a stretch rod (11), which is positioned by a cylinder (12). According to another embodiment, mechanical positioning of the stretch rod (11) is achieved by way of cam segments on which pick-up rollers act. The use of cam segments is in particular advantageous when a plurality of blow molding stations (3) are disposed on a rotary blow molding wheel (25).

In the embodiment shown in FIG. 1, the stretching system is designed so that a tandem arrangement of two cylinders (12) is provided. Initially, prior to the actual stretching operation, a primary cylinder (13) moves the stretch rod (11) to the region of a bottom (14) of the parison (1). During the actual stretching operation, the primary cylinder (13), along with the extended stretch rod, and together with a carriage (15) carrying the primary cylinder (13), is positioned by a secondary cylinder (16) or by way of a cam controller. In particular, the secondary cylinder (16) may be employed in such a cam-controlled manner that a guide roller (17), which slides along a curve track while the stretching operation is carried out, predetermines a current stretching position. The guide roller (17) is pressed against the guide path by the secondary cylinder (16). The carriage (15) slides along two guide elements (18).

After the mold halves (5, 6) disposed in the region of carriers (19, 20) have been closed, the carriers (19, 20) are locked relative to each other with the aid of a locking unit (40).

For adaptation to differing shapes of a mouth section (21) of the parison (1), the use of separate threaded inserts (22) in the region of the blow mold (4) is provided for according to FIG. 2.

In addition to the blow-molded container (2), FIG. 2 also illustrates the parison (1), which is shown with dotted lines, and a schematic view of a developing container bubble (23).

Figure 3:
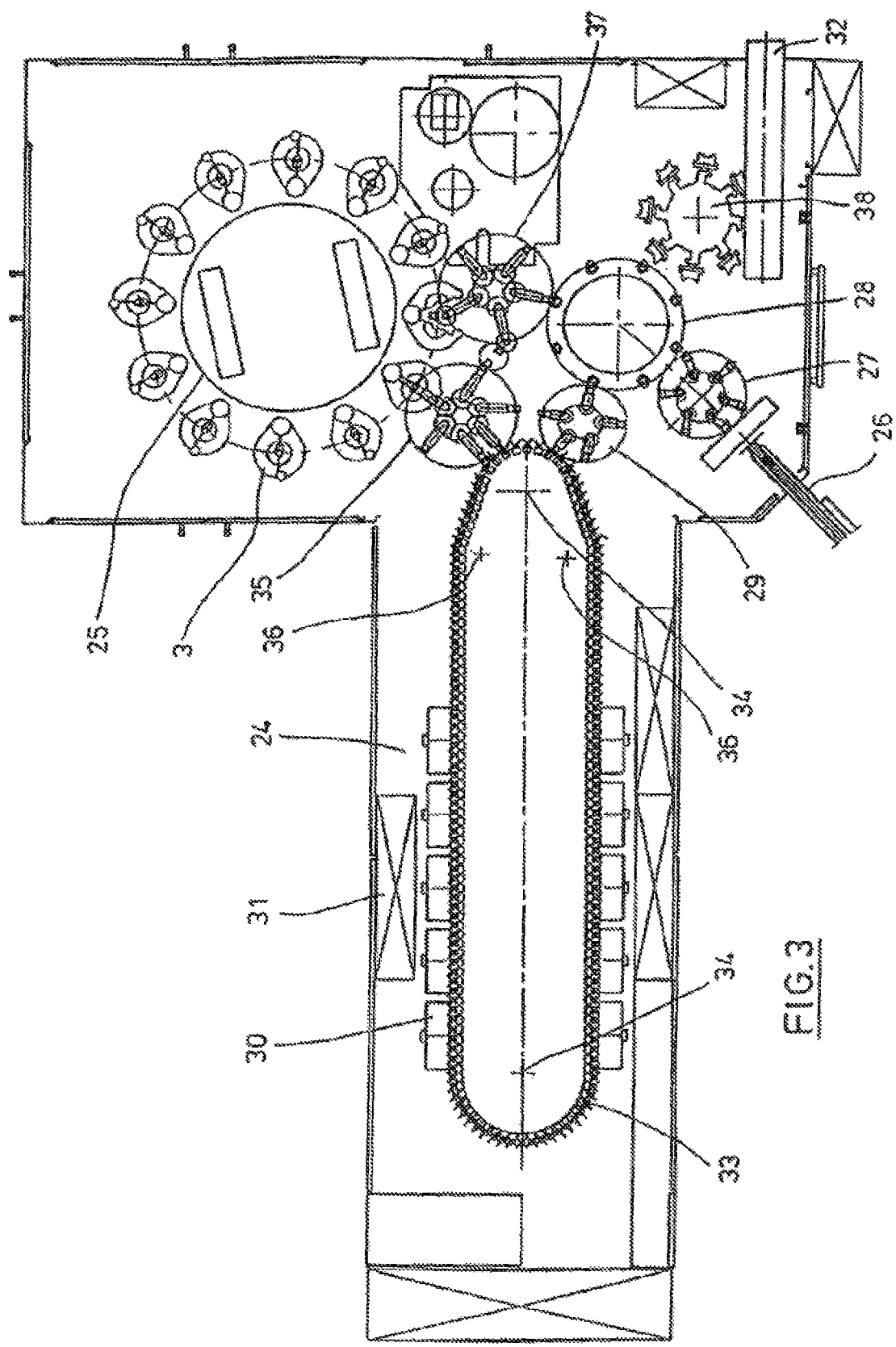
FIG. 3 shows a sketch to illustrate a basic design of a device for blow molding containers.

FIG. 3 shows the basic design of a blow molding machine, which is provided with a heating section (24) and a rotating blow molding wheel (25). Starting from a parison input (26), the parisons (1) are transported by transfer wheels (27, 28, 29) into the region of the heating section (24). Radiant heaters (30) and fans (31) are disposed along the heating section (24) so as to bring the parisons (1) to the desired temperature. After the parisons (1) have been sufficiently adjusted to the desired temperature, they are transferred by a transfer wheel (35) to the blow molding wheel (25), in the region of which the blow molding stations (3) are disposed. The finished blow-molded containers (2) are fed by further transfer wheels (37, 28, 38) to a discharge section (32). The transfer wheel (37) is designed as a removal wheel, and the transfer wheel (38) is designed as a discharge wheel for this purpose.

So as to be able to shape a parison (1) into a container (2) so that the container (2) has material properties that ensure long usability of foodstuffs, in particular beverages, bottled inside the container (2), special method steps must be followed when heating and orienting the parisons (1). Moreover, advantageous effects can be achieved by adhering to special dimensional regulations.

Various plastic materials can be used as the thermoplastic material. For example, PET, PEN or PP are suitable for use.

The expansion of the parison (1) during the orientation process is achieved by supplying pressurized air. The pressurized air supply process is broken down into a pre-blow molding phase, in which gas, such as compressed air, is supplied at a lower pressure level, and a subsequent main blow molding phase, in which gas having a higher pressure level is supplied. During the pre-blow molding phase, typically pressurized air having a pressure in the interval of 10 bar to 25 bar is used, and during the main blow molding phase, pressurized air having a pressure in the interval of 25 bar to 40 bar is supplied.

It is also apparent from FIG. 3 that, in the embodiment shown, the heating section (24) is composed of a plurality of revolving transport elements (33), which adjoin each other in a chain-like manner and are guided along deflection wheels (34, 36). In particular, the chain-like arrangement may form a substantially rectangular base contour. In the embodiment shown, a single deflection wheel (34) having relatively large dimensions is used in the region of the extent of the heating section (24) facing the transfer wheel (27), and two deflection wheels (36) having comparatively smaller dimensions are used in the region of neighboring deflections. However, in principle any arbitrary other guides are also conceivable.

So as to allow the transfer wheel (27) and the blow molding wheel (25) to be disposed as closely relative to each other as possible, the arrangement shown has been found to be particularly advantageous since three deflection wheels (34, 36) are positioned in the region of the corresponding extent of the heating section (24), and more particularly the smaller deflection wheels (36) are positioned in the region of the transition to the linear progression of the heating section (24) and the larger deflection wheel (34) is positioned in the immediate transfer region to the transfer wheel (27) and to the blow molding wheel (25).

As an alternative to the use of chain-like transport elements (33 is also possible to use a rotating heating wheel, for example.

After the blow molding of the containers (2) has been finished, these are guided out of the region of the blow molding stations (3) by the transfer wheel (38) and transported to the discharge section (32).

Figure 4:
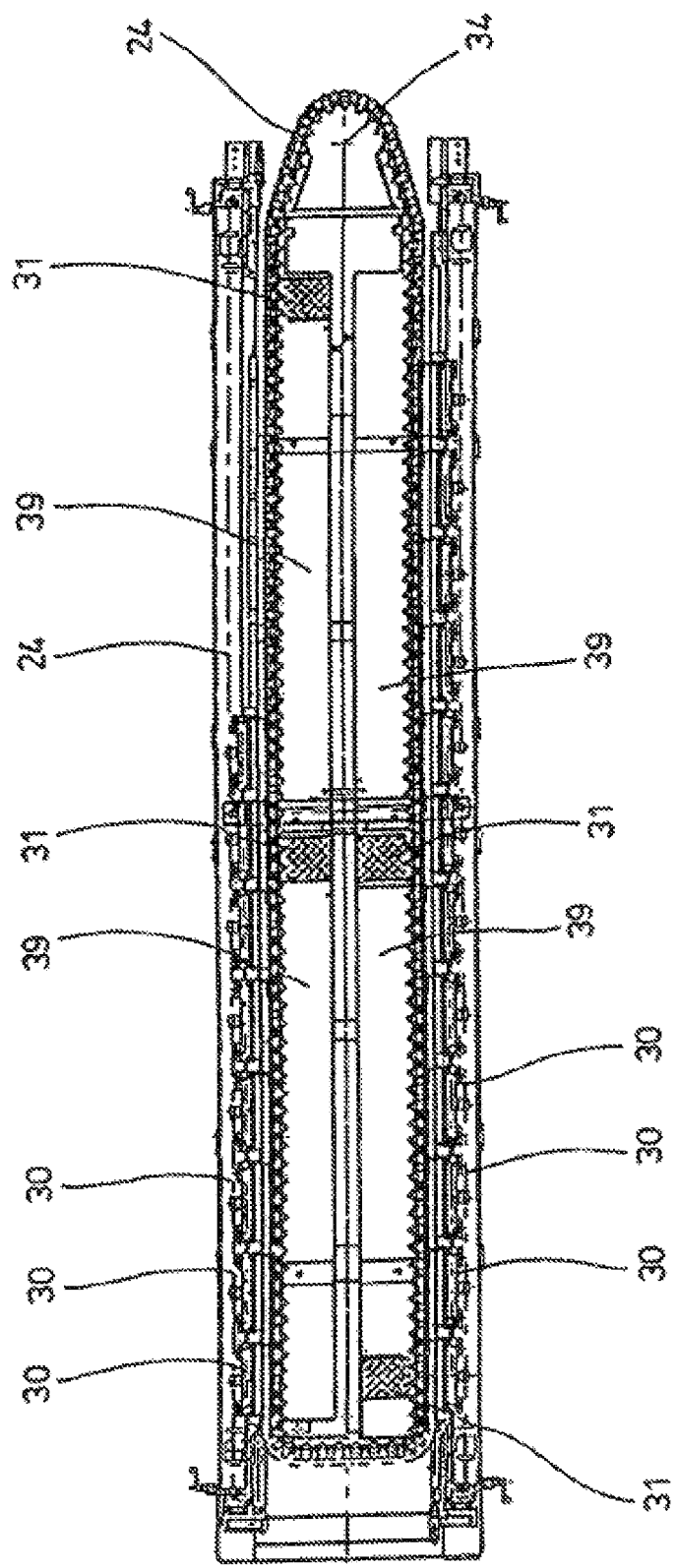
FIG. 4 shows a modified heating section having increased heating capacity.

A larger number of parisons (1) can be adjusted to the desired temperature per unit of time in the modified heating section (24) illustrated in FIG. 4 due to the larger number of radiant heaters (30). Here, the fans (31) conduct cooling air into the region of cooling air channels (39), which are located opposite the associated radiant heaters (30), respectively, and deliver the cooling air via outflow openings. As a result of the arrangement of the outflow directions, a flow direction for the cooling air that is substantially transversely to a transport direction of the parisons (1) is achieved. The cooling air channels (39) can provide reflectors for the heat radiation in the region of surfaces that are located opposite the radiant heaters (30); likewise, it is possible to also implement cooling of the radiant heaters (30) via the cooling air that is given off.

The parisons (1) and the containers (2) can be transported through the blow molding machine in a wide variety of ways. According to one embodiment variant, the parisons are carried by transport mandrels at least along a substantial portion of the transport path thereof. However, it is also possible to transport the parisons using tongs, which engage on the outside of the parison, or to use inside mandrels, which are inserted into a mouth region of the parison. With respect to the spatial orientation of the parisons, differing variants are likewise conceivable.

According to one variant, the parison is fed in the region of the parison input (26) having the mouth oriented perpendicularly upward, is then rotated, conveyed along the heating section (24) and the blow molding wheel (25) having the mouth oriented perpendicularly downward, and is rotated again prior to reaching the discharge section (32). According to another variant, the parison (2) is heated in the region of the heating section (24) having the mouth oriented perpendicularly downward, however it is rotated again by 180° prior to reaching the blow molding wheel (25).

According to a third embodiment variant, the parison passes through the entire region of the blow molding machine having the mouth oriented perpendicularly upward, without undergoing any turning operations.

Figure 5:
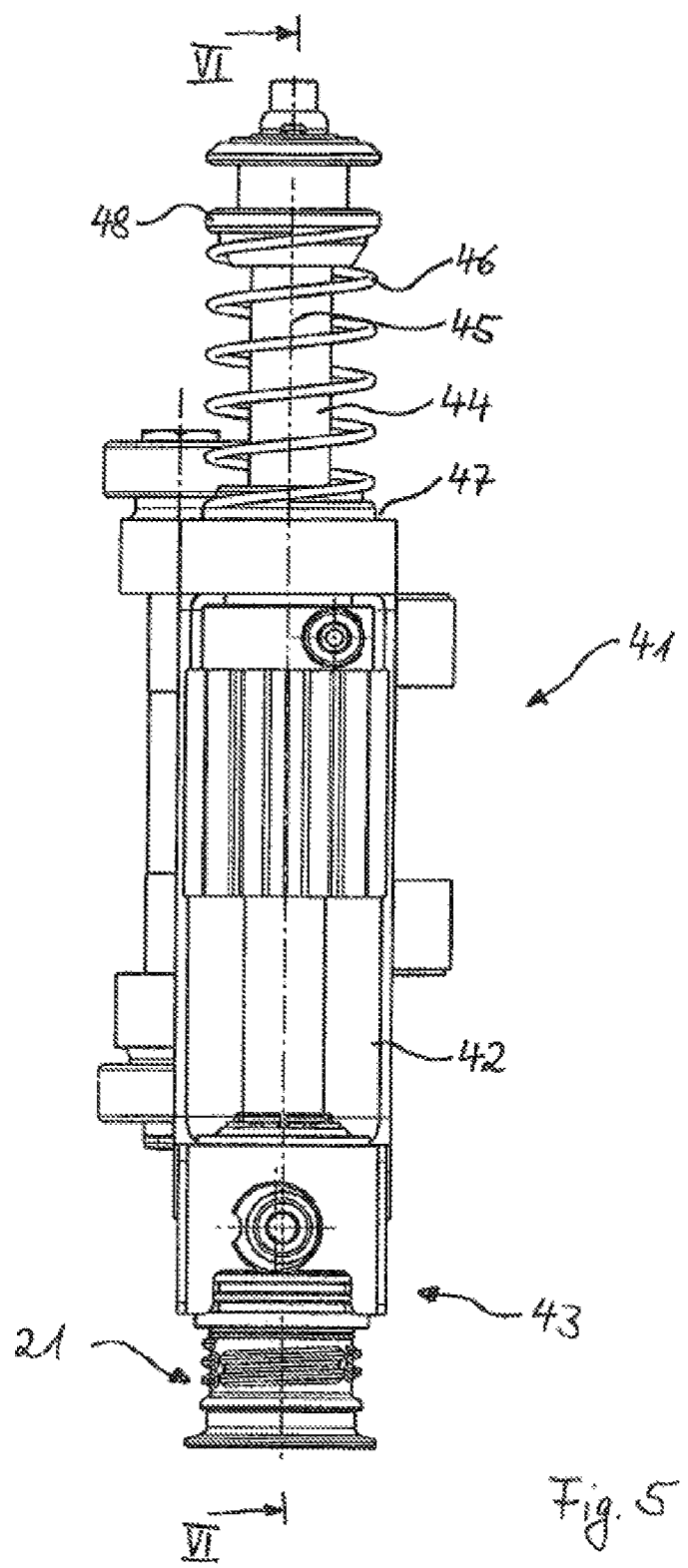
FIG. 5 shows a side view of a carrying element.

FIG. 5 shows a partial representation of a side view of a parison (1), in the mouth section (21) of which a carrying element (41) is inserted in some regions.

The carrying element (41) has an element base (42), a head (43) facing the parison (1), and a shaft (44) connected to the head (43). The shaft (44), together with the head (43), can be moved relative to the element base (42) in the direction of the longitudinal element axis (45). A basic position of the shaft (44) relative to the element base (42) can be predetermined by a spring (46). In the exemplary embodiment shown, the spring (46) is disposed between an upper face (47) of the element base (42) and an end segment (48) protruding laterally beyond the shaft (44).

According to a typical exemplary embodiment, a plurality of element bases (42) can be connected to each other in a chain-like manner or can be connected to a revolving conveyor chain. However, the carrying element (41) can also be provided on revolving transfer wheels or other devices. According to a typical exemplary embodiment, the shaft (44) is likewise positioned relative to the element base (42) in a cam-controlled manner by way of a cam, which extends at least in some sections along a transport path of the carrying element (41).

Figure 6:
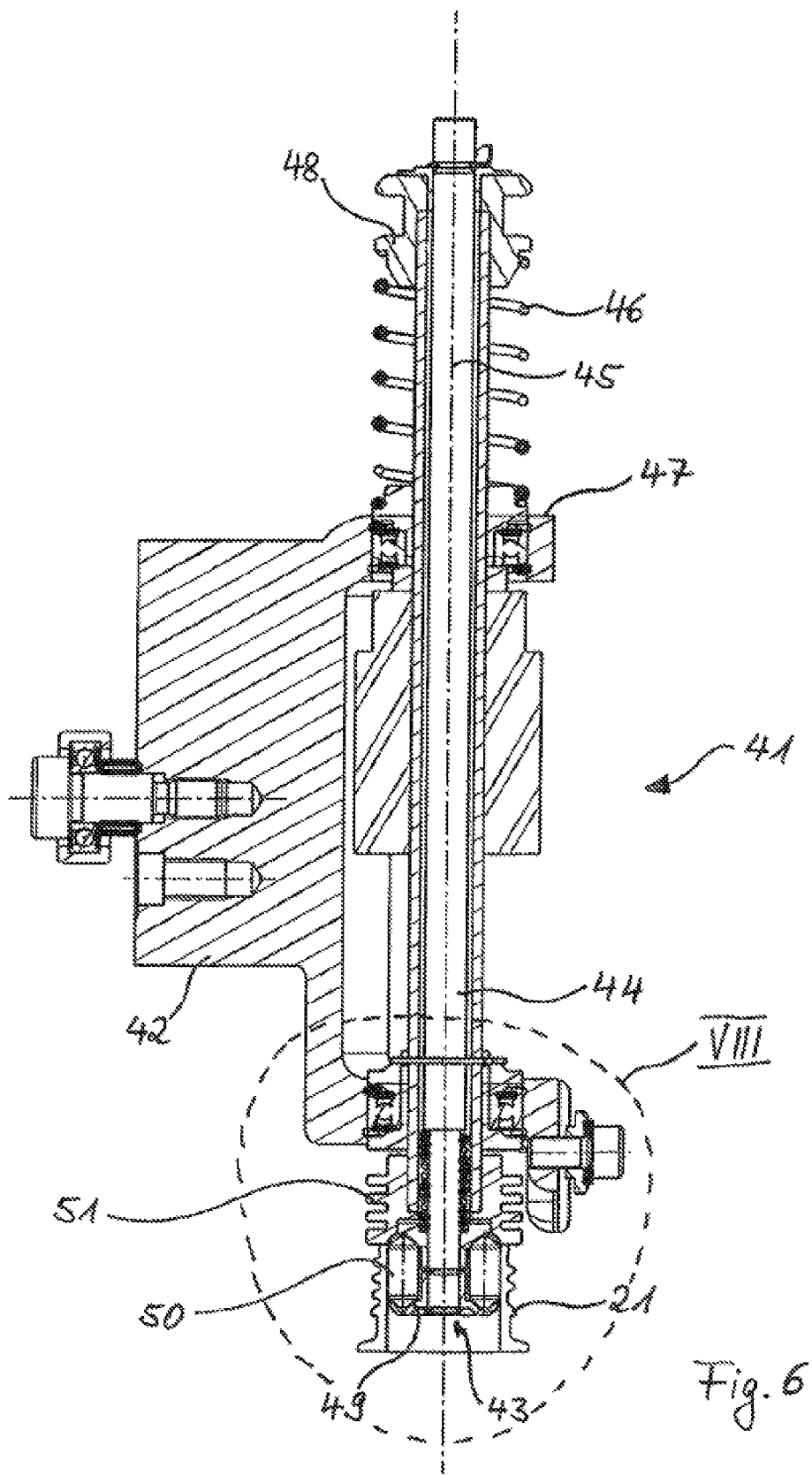
FIG. 6 shows a vertical section according to intersecting line VI in FIG. 5.

FIG. 6 is a longitudinal sectional view of the positioning of the head (43) within a mouth section (21) of a parison (1) or of a container (2). It is apparent that the head (43) has recesses (49), in which clamping elements (50) are disposed. Outside the region that can be inserted into the mouth section (21), the head (43) may comprise a heat sink (51), which is provided with cooling fins for heat emission.

Figure 7:
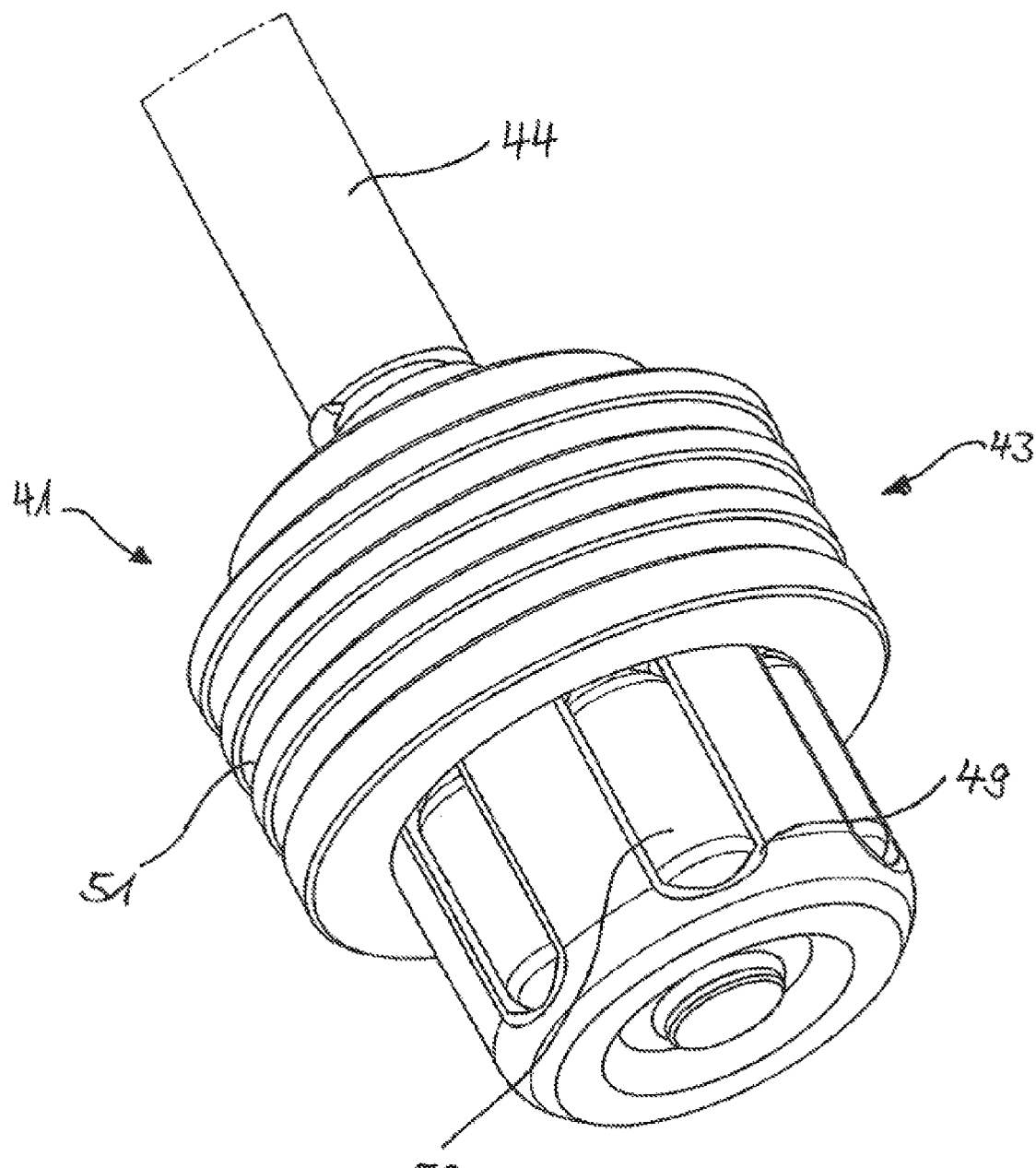
FIG. 7 shows a perspective illustration of a head of a carrying element.

FIG. 7 shows a perspective illustration of the head (43) to further illustrate in particular the arrangement of the clamping elements (50) in the recesses (49). It is apparent that the clamping elements (50) have a roller-like basic contour having tapered end segments. The end segments can be designed as truncated cones, for example.

Figure 8:
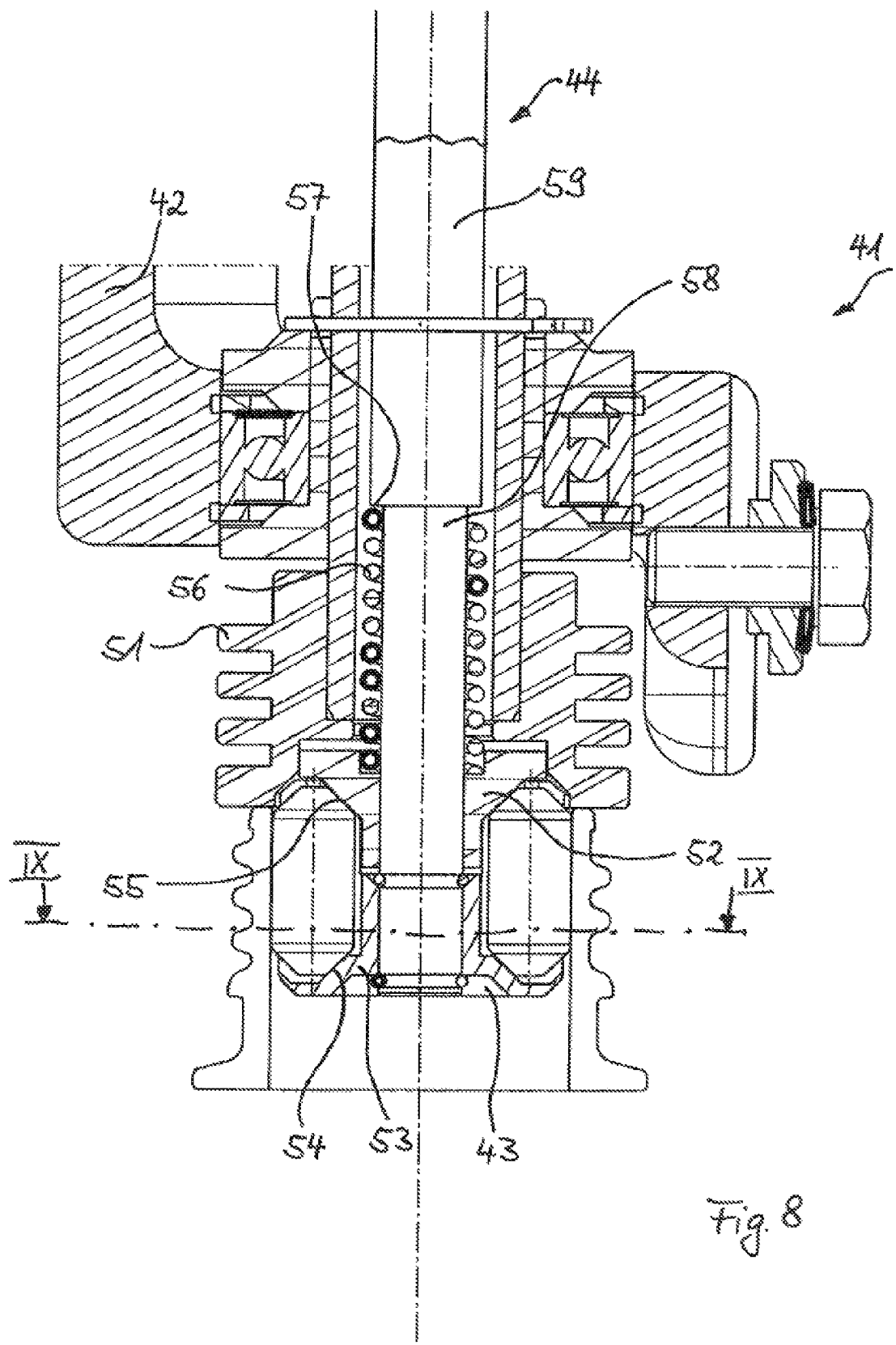
FIG. 8 shows an enlarged illustration of the detail VIII of FIG. 6.

FIG. 8 shows an enlarged illustration of the detail VIII of FIG. 6. It is apparent from FIG. 8 that the head (43) is composed of an upper head part (52) and a lower head part (53). The lower head part (53) is connected to the shaft (44). The shaft (44) extends through the upper head part (52). While the lower head part (53) is rigidly connected to the shaft (44) in terms of the movement of the part, the upper head part (52) is supported on the shaft by way of a spring (56). Since the spring (56) is a compression spring and acts on the upper head part (52) on the side facing away from the lower head part, the upper head part (52) and the lower head part (53) are pushed toward each other.

FIG. 8 likewise illustrates that the lower head part (53) has a lower sliding surface (54) so as to regionally bound the recess (49). The upper head part (52) is provided with an upper sliding surface (55), likewise so as to regionally bound the recess (49). When a plurality of recesses (49) are provided along the outer circumference of the head (43), the number of upper and lower sliding surfaces (54, 55) used corresponds to the number of the recesses (49).

A spring (56), which braces the upper head part (52) relative to the shaft (44), is disposed on a side of the upper head part (52) facing away from the lower head part (53) in the direction of the longitudinal element axis (45). The shaft (44) has a step (57) for this purpose as a supporting surface for the spring (56). As an alternative, however, different supporting elements could also be used for the spring (56).

The step (57) can be achieved in a simple manner by a two-part configuration of the shaft (44). In the region of the extent facing the head (43), the shaft (44) is composed of a rod for this purpose, which is inserted into a tubular outer part. The step (57) is provided in the region of the end of the tubular part.

The sliding surfaces (54, 55) are each disposed at an incline with respect to the longitudinal element axis (45). Delimiting surfaces of the tapers of the clamping elements (50) likewise extend at an incline with respect to the longitudinal axis (45). The angles of inclination of the delimiting surfaces of the tapers are preferably selected to be substantially identical to the angles of inclination of the sliding surfaces (54, 55) relative to the longitudinal element axis (45).

Figure 9:
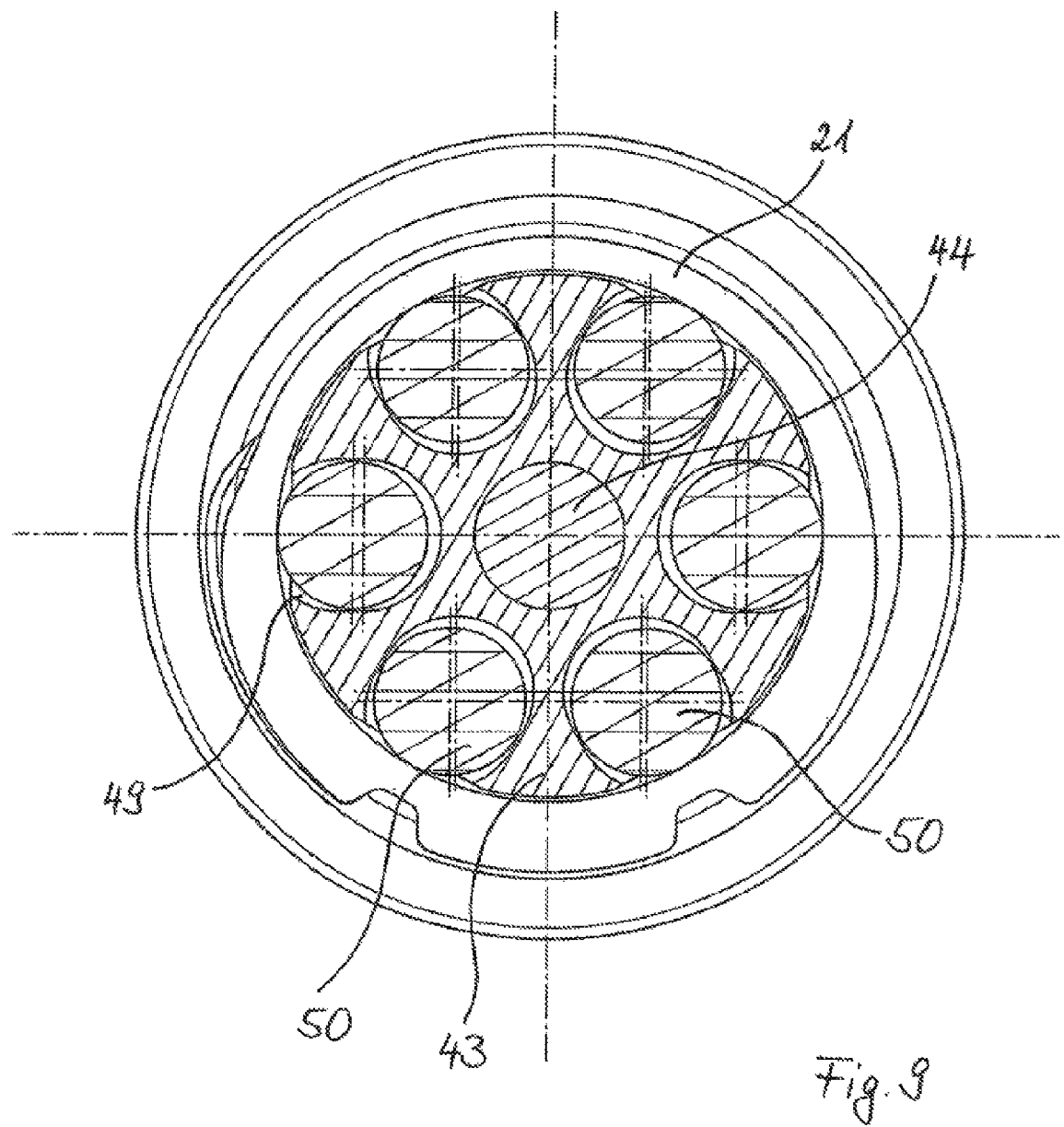
FIG. 9 shows a horizontal section according to intersecting line IX of FIG. 8.

FIG. 9 is a horizontal sectional view to illustrate the arrangement of a plurality of clamping elements (50) in respective associated recesses (49). The exemplary embodiment of FIG. 9 shows the use of six clamping elements (50) in six recesses (49). The clamping elements (50) act on an inner side of the mouth section (21).

It has been found to be particularly advantageous when the clamping elements (50) act on the mouth section (21) from the inside. An outer region of the mouth section (21) thus remains free for handling, such as by way of tongs. Moreover, damage to the sensitive threaded region of the mouth section (21) is prevented. The thread is used to later screw on caps of a filled container (2), and damage here would result in leaking.

The invention claimed is:

1. A device for blow molding containers comprising:
   a heating section for heating parisons made of a thermoplastic material;
   a blow molding unit having at least one blow molding station for shaping the parisons into the containers; and
   a carrying element comprising a head for transporting the parisons;
   wherein the carrying element comprises at least two positionable clamping elements that are disposed in a region of the head configured for insertion into a mouth section of a parison,
   wherein the clamping elements are spaced apart from each other and include portions having a rounded contour that protrude beyond an outer circumference of the head,
   wherein at least one of the clamping elements is positioned in a recess provided on a side of the head,
   wherein the recess is defined at least in part by upper and lower sliding surfaces, each of which extends obliquely relative to a longitudinal axis of the carrying element,
   wherein the lower sliding surface is provided on a lower head part and the upper sliding surface is provided on an upper head part,
   wherein the upper head part and the lower head part are biased toward each other by at least one spring, which acts on the upper head part in a region facing away from the lower head part,
   wherein the carrying element provides a passive clamping function, and
   wherein forces transmitted to the at least one clamping element when the head is inserted into the mouth of the parison result in an increase in a size of the recess and a decrease in clamping force between the at least one clamping element and an inner side of the mouth section of the parison.

2. The device according to claim 1, wherein the carrying element is configured to mount the parison such that the mouth section is oriented perpendicularly upward.

3. The device according to claim 1, wherein the lower head pad is connected to a shaft.

4. The device according to claim 3, wherein the shaft extends through the upper head part.

5. The device according to claim 1, wherein the spring is a compression spring.

6. The device according to claim 3, wherein the shaft extends through the spring.

7. The device according to claim 6, wherein the spring is supported on a projection of the shaft.

8. The device according to claim 7, wherein the projection is formed by a step.

9. The device according to claim 3, wherein the shaft comprises a rod and a tube that surrounds at least a portion of the rod.

10. The device according to claim 1, wherein the at least one clamping element is cylindrical at least in some regions and has tapered end regions that point in a direction of the longitudinal axis.

11. The device according claim 10, wherein the tapered end regions are in the form of truncated cones.

12. The device according to claim 10, wherein the tapered end regions have angles of inclination relative to the longitudinal axis which correspond to angles of inclination of the upper and lower sliding surfaces relative to the longitudinal axis.

* * * * *

UNITED STATES PATENT AND TRADEMARK OFFICE
CERTIFICATE OF CORRECTION

Page 1 of 1

PATENT NO. : 8,992,208 B2
APPLICATION NO. : 14/236866
DATED : March 31, 2015
INVENTOR(S) : Linke et al.

It is certified that error appears in the above-identified patent and that said Letters Patent is hereby corrected as shown below:

In the Claims

Column 9, Line 2 (Claim 3, Line 2), delete "pad" and insert --part--.

Signed and Sealed this
Seventh Day of July, 2015

Michelle K. Lee
*Director of the United States Patent and Trademark Office*